(12) United States Patent
Yamamoto et al.

(10) Patent No.: US 6,222,680 B1
(45) Date of Patent: Apr. 24, 2001

(54) ZOOM LENS

(75) Inventors: Chikara Yamamoto, Urawa; Hiroshi Yamada, Omiya; Akiko Nagahara, Koshigaya, all of (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/542,861

(22) Filed: Apr. 4, 2000

(30) Foreign Application Priority Data

Apr. 8, 1999 (JP) .................................................. 11-101009

(51) Int. Cl.$^7$ .................................................. G02B 15/14
(52) U.S. Cl. .......................... 359/680; 359/681; 359/682; 359/683
(58) Field of Search .................................. 359/680, 681, 359/682, 683

(56) References Cited

U.S. PATENT DOCUMENTS 6,008,952 * 12/1999 Yamamoto ........................... 359/683

FOREIGN PATENT DOCUMENTS 5-297276   11/1993 (JP) .
10-268193  10/1998 (JP) .

* cited by examiner

*Primary Examiner*—Georgia Epps
*Assistant Examiner*—Michael A. Lucas
(74) *Attorney, Agent, or Firm*—Arnold International; Bruce Y. Arnold

(57) ABSTRACT

A zoom lens for primary use with a projection screen television system is disclosed having five lens groups, in sequential order from the enlarging side, of negative, positive, positive, negative, and positive refractive power. The first lens group and the fifth lens group are fixed, and the axial positions of the second lens group, the third lens group, and the fourth lens group vary when zooming so as to provide a change in magnification and to correct for shifting of the image surface which otherwise would occur with zooming. Specified conditions are satisfied in order to provide a zoom lens that is compact, is well-corrected for aberrations over the entire range of zoom, has a sufficient back focus on the reducing side for insertion of lens components needed for projecting color images, is nearly telecentric on its reducing side, and provides a sufficiently bright image with a wide-angle of view.

8 Claims, 10 Drawing Sheets

Embodiment 1

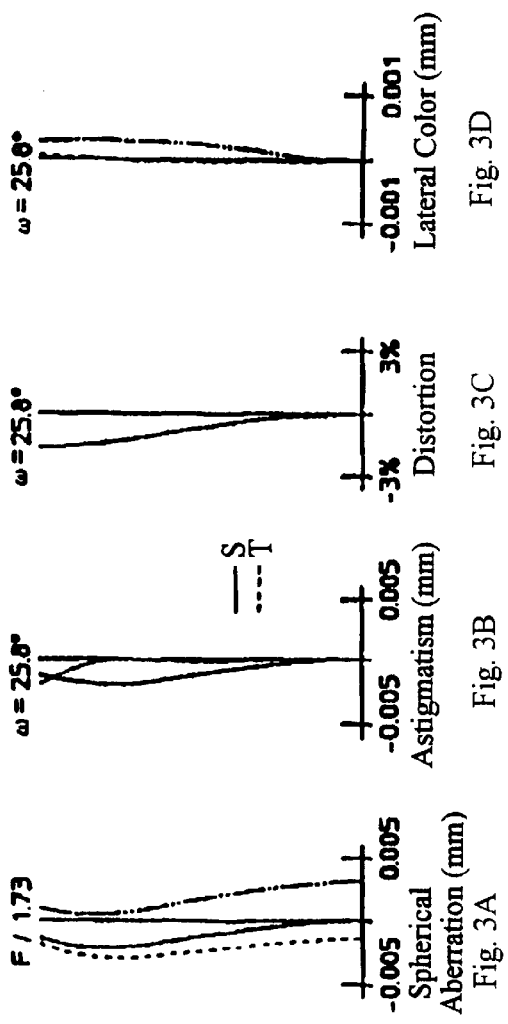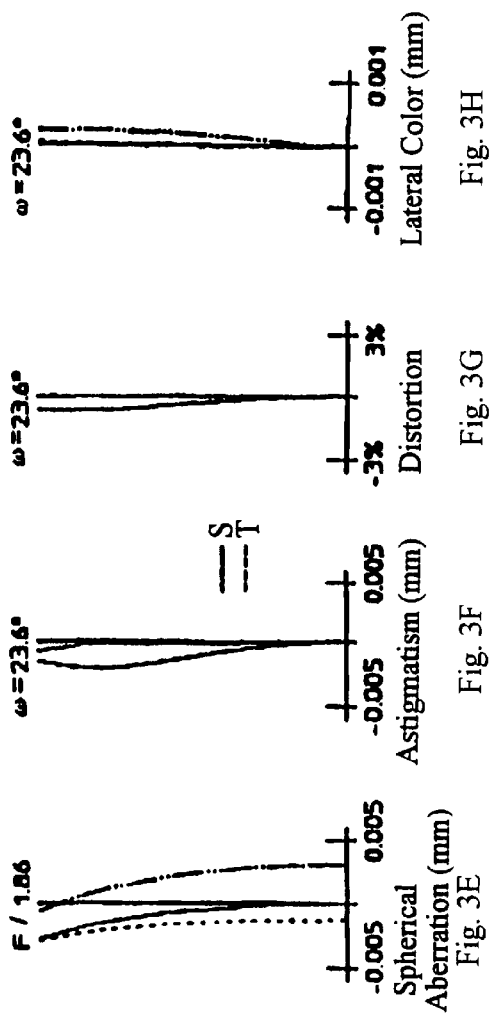

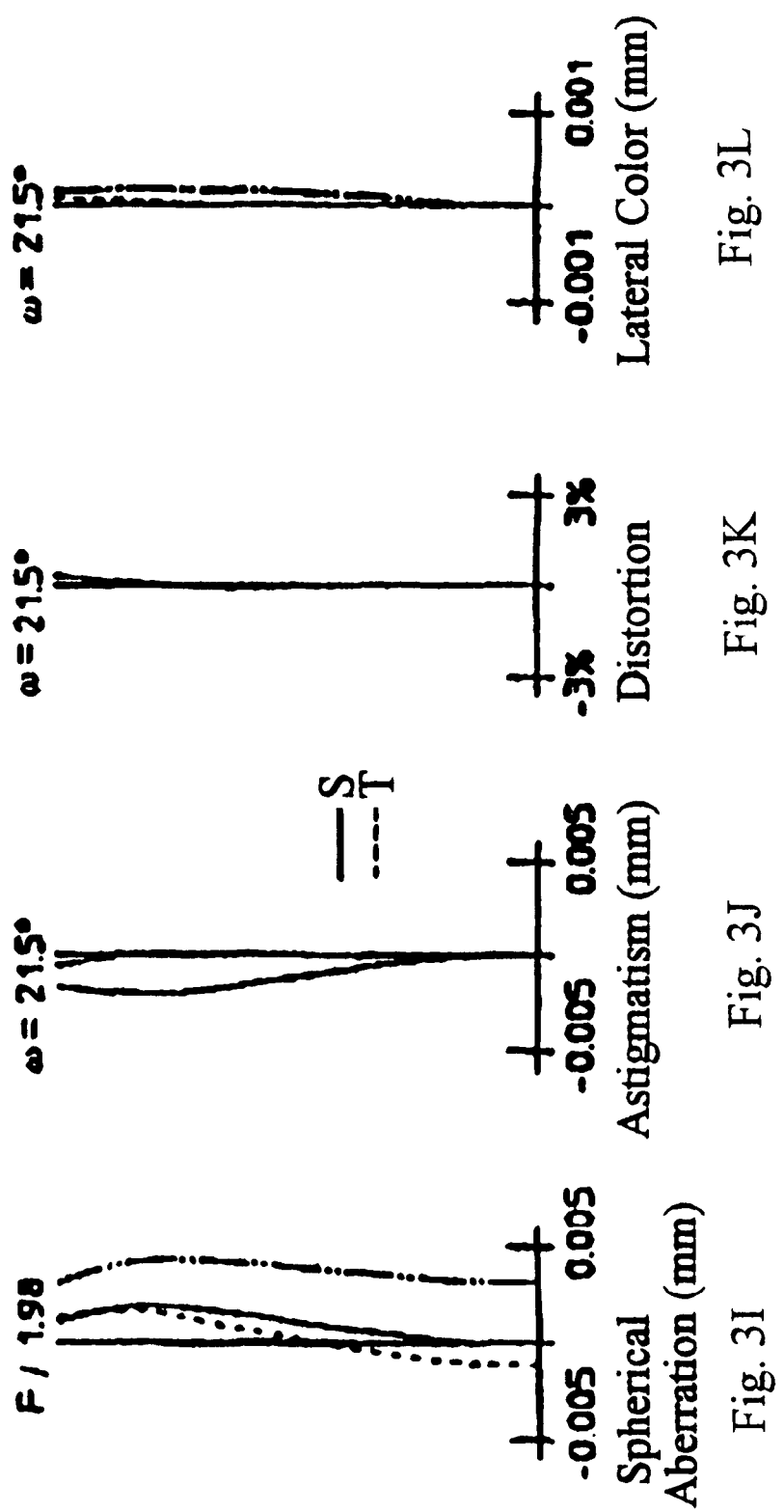

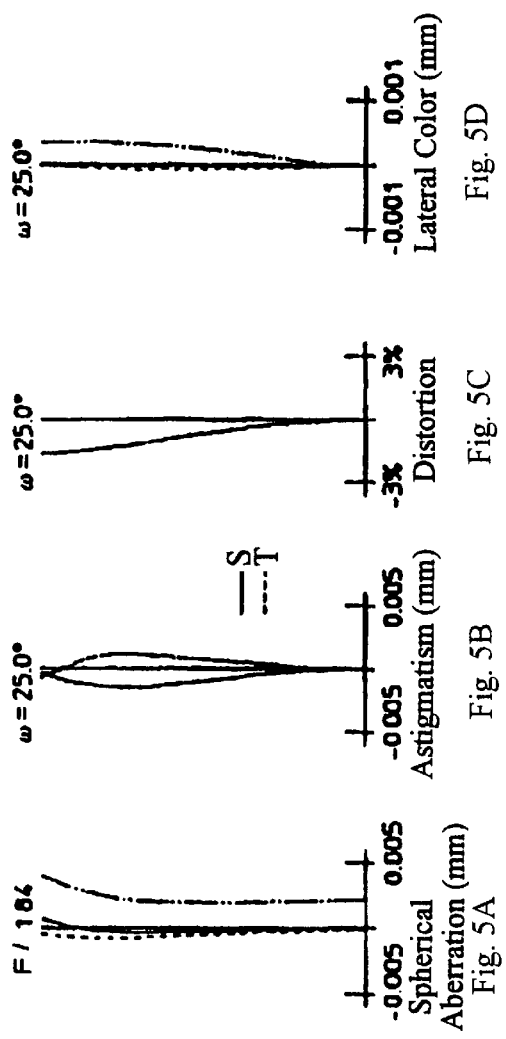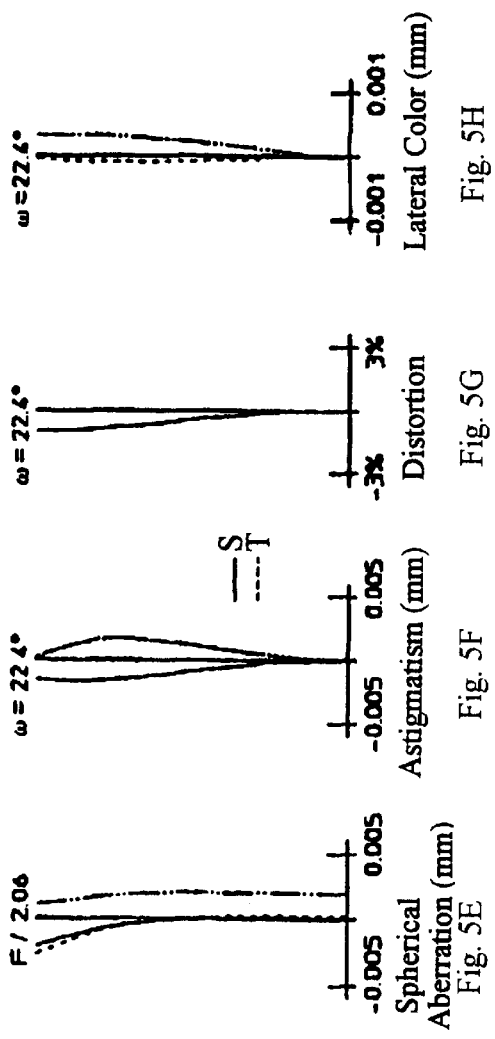

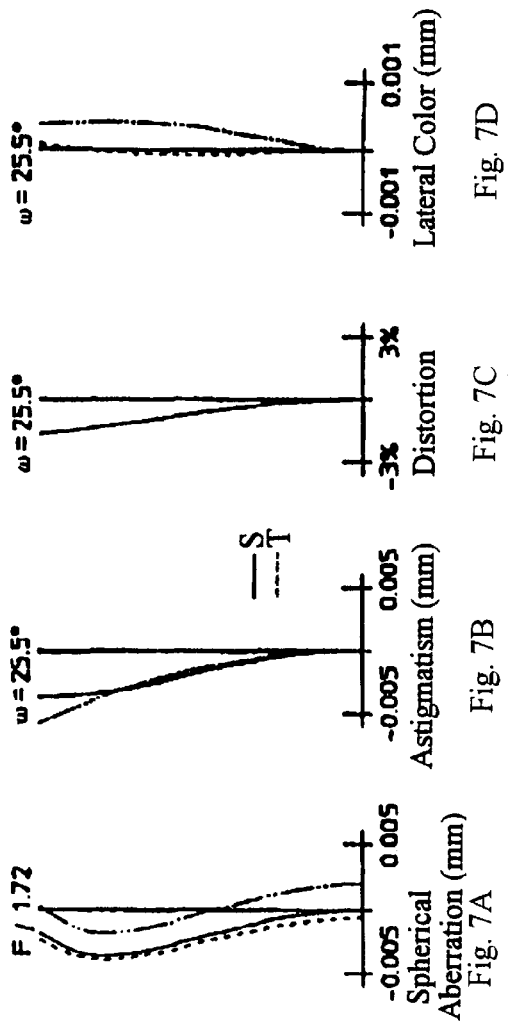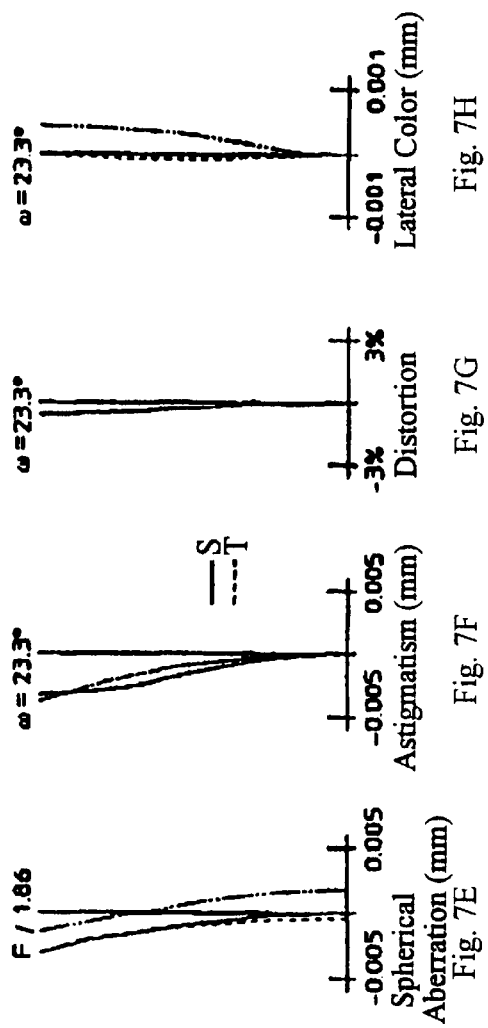

ZOOM LENS

BACKGROUND OF THE INVENTION

A zoom lens having four lens groups such as in Japanese Laid Open Patent Application No. H5-297276 is known. The first lens group, in order from the enlarging side, is of negative refractive power and has a fixed position. The second lens group is of positive refractive power and moves in order to provide a zoom function. The third lens group is of negative refractive power and moves in order to correct for shifting of the image plane which otherwise would occur with zooming. The fourth lens group is of positive refractive power and is fixed in position. This type of zoom lens is often used with an image-sensing device, such as a small-sized CCD array, and so on. However, if one attempts to use such a lens for forming a large-sized image without modification in design of such a lens, the size of the lens that is needed becomes excessive. When this type of zoom lens is used as a projection lens, which requires a low value of distortion aberration, many zoom lenses of this type are unsuitable because the distortion is excessive.

When used for a projection lens with a liquid crystal display, it is desirable that the reducing side of the zoom lens be configured as an abbreviated telecentric optical system, in order that the light illuminating the liquid crystal display be normal to the display surfaces. However, many of the prior art devices lack those characteristics. In addition, few such zoom lenses have a sufficiently large back focus to allow room for insertion of an optical component for color separation or color synthesis between the lens system and the image surface.

In order to resolve such problems, a zoom lens as described in Japanese Laid Open Patent Application No. H10-268193 has been proposed which is constructed of five lens groups. The first lens group $G_1$, in order from the enlarging side, has negative refractive power and is fixed in position. The second lens group $G_2$ and the third lens group $G_3$ are each of positive refractive power. The fourth lens group $G_4$ has negative refractive power. The second through fourth lens groups $G_2$–$G_4$ move in order to accomplish zooming and to simultaneously correct for shifting of the image plane which otherwise would accompany zooming. The fifth lens group $G_5$ has positive refractive power and is fixed in position. In addition, certain specified conditions are satisfied.

However, concerning many newer liquid crystal projectors, a micro lens is attached to the front surface of the liquid crystal element. The micro lens widens the angle over which light is emitted, and efficiently absorbs diffracted light otherwise produced and reflected when ambient light is incident on the liquid crystal element.

A zoom lens that provides a bright image is thus required in this type of projector. The above-mentioned Japanese Laid Open Patent Application No.H10-268193 is known for its low $F_{NO}$, of approximately 2.5. Nevertheless, there is demand for a zoom lens that is compact and yet has a sufficient back focus to accommodate color synthesizing components on its reducing side, has well-corrected aberrations so as to produce a high-quality, bright image, and is telecentric on its reducing side so as to be suitable for use with a liquid crystal display.

BRIEF SUMMARY OF THE INVENTION

The object of the present invention is to overcome the above-discussed problems by introducing a zoom lens which has the following characteristics: (a) the lens is compact; (b) the lens sufficiently corrects for various aberrations, (c) the back focus of the lens on the reducing side is long, (d) the lens is nearly telecentric on its reducing side, and (e) the lens provides a sufficiently bright image with a wide-angle of view.

BRIEF DESCRIPTION OF DRAWINGS

The present invention will become more fully understood from the detailed description given below and the accompanying drawings, which are given by way of illustration only and thus are not limitative of the present invention, wherein:

FIGS. 3A–3L show various aberrations of the zoom lens of Embodiment 1.

FIGS. 3A–3D show the spherical aberration, astigmatism (in the S and T planes), distortion, and lateral color, respectively, of Embodiment 1 at the wide-angle end, FIGS. 3E–3H show the spherical aberration, astigmatism (in the S and T planes), distortion, and lateral color, respectively, of Embodiment 1 at the mid-position and FIGS. 3I–3L show the spherical aberration, astigmatism (in the S and T planes), distortion, and lateral color, respectively, of Embodiment 1 at the telephoto end, FIGS. 5A–5L show various aberrations of the zoom lens of Embodiment 2.

FIGS. 5A–5D show the spherical aberration, astigmatism (in the S and T planes), distortion, and lateral color, respectively, of Embodiment 2 at the wide-angle end, FIGS. 5E–5H show the spherical aberration, astigmatism (in the S and T planes), distortion, and lateral color, respectively, of Embodiment 2 at the mid-position, and FIGS. 5I–5L show the spherical aberration, astigmatism (in the S and T planes), distortion, and lateral color, respectively, of Embodiment 2 at the telephoto end, FIGS. 7A–7L show various aberrations of the zoom lens of Embodiment 3.

FIGS. 7A–7D show the spherical aberration, astigmatism (in the S and T planes), distortion, and lateral color, respectively, of Embodiment 3 at the wide-angle end, FIGS. 7E–7H show the spherical aberration, astigmatism (in the S and T planes), distortion, and lateral color, respectively, of Embodiment 3 at the mid-position, and FIGS. 7I–7L show the spherical aberration, astigmatism (in the S and T planes), distortion, and lateral color, respectively, of Embodiment 3 at the telephoto end.

DETAILED DESCRIPTION

Figure 1:
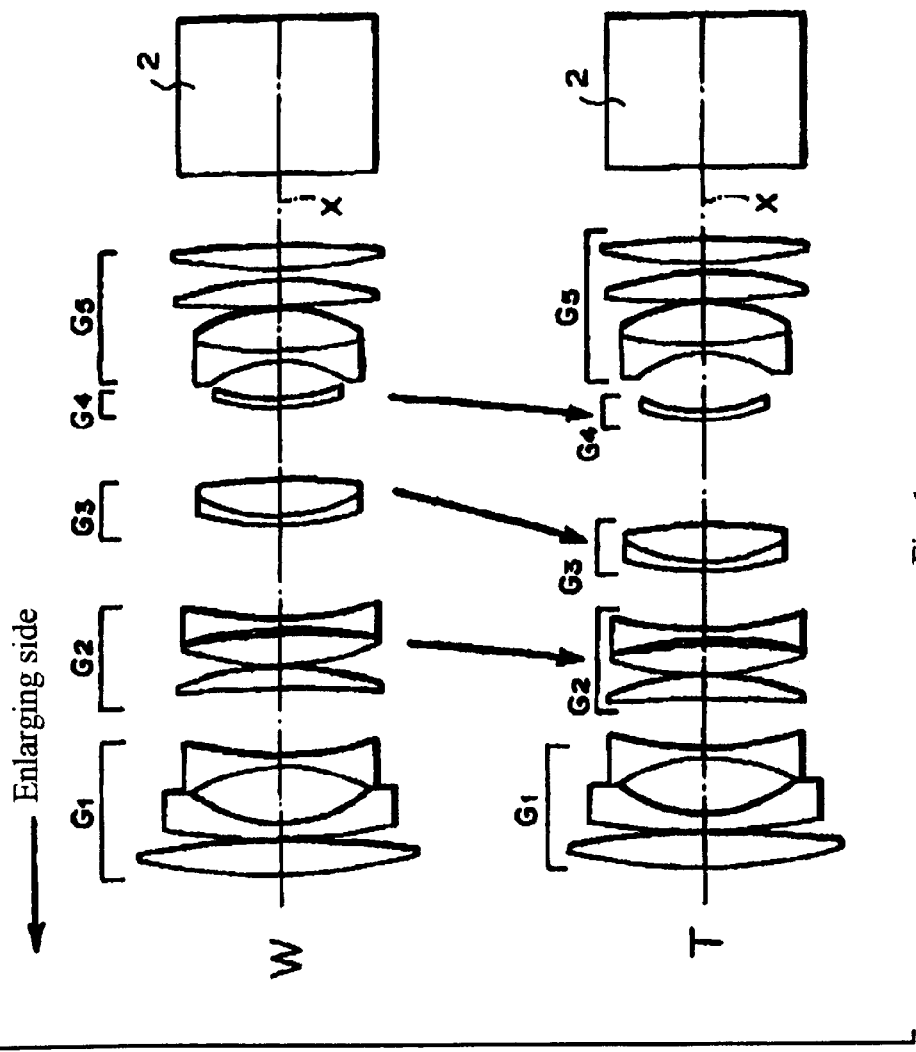
FIG. 1 shows the basic lens element configuration of Embodiment 1 of the invention at the wide-angle end W and the telephoto end T, with the arrows indicating the movement of the lens groups $G_2$–$G_4$ along the optical axis X between these two zoom positions.

The zoom lens of the present invention is formed of five lens groups having refractive powers, in order from the enlarging side, of negative, positive, positive, negative, and positive. The first lens group $G_1$ and the fifth lens group $G_5$ in order from the enlarging side are fixed in position, whereas the second lens group $G_2$, the third lens group $G_3$ and the fourth lens group $G_4$ move to perform zooming and to correct for image plane shifts that otherwise would accompany zooming. Further, the following Conditions (1) to (3) are preferably satisfied:

$-0.9 \leq f_1/F < -0.3$   Condition (1)

$0.7 < f_2/F < 1.5$   Condition (2)

$0.8 < f_5/F < 1.5$   Condition (3)

where $f_1$ is the focal length of the first lens group $G_1$,

F is the focal length of the zoom lens at the wide-angle end, $f_2$ is the focal length of the second lens group $G_2$, and $f_5$ is the focal length of the fifth lens group $G_5$.

The second lens group $G_2$ includes two or more lens elements, at least two of which are of positive refractive power. Preferably, when zooming from the wide-angle end to the telephoto end, the lens group spacing between the second lens group $G_2$ and the third lens group $G_3$ decreases.

In addition to the above conditions, the zoom lens of the present invention preferably also satisfies the following Conditions (4) and (5):

$0.1 < D_2/F < 0.9$   Condition (4)

$0.05 < |\Delta D_2|/(F \times F_t)^{0.5} < 0.5$   Condition (5)

where $D_2$ is the spacing at the wide angle end between the second lens group $G_2$ and the third lens group $G_3$, $\Delta D_2$ is the change in distance between the second lens group $G_2$ and the third lens group $G_3$ when zooming from the wide-angle end to the telephoto end, F is as defined above, and $F_t$ is the focal length of the zoom lens at the telephoto end.

The third lens group $G_3$ has only two lens elements, one of which is of positive refractive power and the other which is of negative refractive power. These two lens elements may be separated or joined. In addition, the following Condition is preferably satisfied $\upsilon_{(-)} < 40$   Condition (6)

where $\upsilon_{(-)}$ is the Abbe value of the negative lens element in the third lens group $G_3$.

The construction of the three lens groups $G_2$, $G_3$ and $G_4$ reduces aberration shifts when zooming. By using more than two positive lens elements in the second lens group $G_2$, various aberrations can be favorably corrected despite the zoom lens having a small $F_{NO}$. Thus a high quality and bright image is provided by the zoom lens.

Concerning Condition (1) above, if the negative power of the first lens group $G_1$ is such that the ratio of $f_1/F$ is less than the lower limit: (a) it is difficult for such a lens group with a small $F_{NO}$ to adequately correct for aberrations, (b) the movement amount of the lens groups that move increases when focusing, and (c) the shifting of aberration when zooming from the wide-angle end to the telephoto end increase. On the other hand, if the negative refractive power in the first lens group $G_1$ becomes stronger, so that the upper limit of $f_1/F$ is exceeded, the axial beam is shifted upward too much. This results in it being difficult to correct for the various aberrations, such as distortion and spherical aberration.

Concerning Condition (2) above, if the positive power in the second lens group $G_2$ is such that the lower limit is not satisfied, the amount of shift which accompanies zooming becomes larger and the lens diameters thus must increase. On the other hand, if the positive refractive power in the second lens group $G_2$ exceeds the upper limit, it becomes difficult to correct for aberrations.

Concerning Condition (3) above, if the positive power of the fifth lens group $G_5$ exceeds the upper limit, the back focus of the zoom lens becomes shorter, and it becomes difficult to insert components between the zoom lens and the image surface. On the other hand, if the positive power of the fifth lens group $G_5$ is such that the lower limit is not satisfied, the back focus becomes too long and the size of the lens becomes to large. In addition, the axial beam height becomes too low, and it is difficult to correct for the aberration.

Concerning Condition (4), if the spacing $D_2$ between the second lens group $G_2$ and the third lens group $G_3$ becomes such that the lower limit is not satisfied, various aberrations, especially distortion, will be excessive. If the spacing between the second lens group $G_2$ and the third lens group $G_3$ is such that the upper limit is exceeded, the overall size of the zoom lens becomes excessive.

Concerning Condition (5), if the change in spacing between the second lens group $G_2$ and the third lens group $G_3$ in zooming from the wide-angle end to the telephoto end exceeds the upper limit, it becomes difficult to correct for aberration shifts which accompany zooming. On the other hand, if the change in spacing between the second lens group $G_2$ and the third lens group $G_3$ in zooming between the wide angle and telephoto ends becomes less than the lower limit, it becomes difficult to provide a sufficient amount of zoom.

Concerning Condition (6), if the upper limit is exceeded, it becomes difficult to correct for chromatic aberration.

Three embodiments of the zoom lens of the present invention will now be given, with reference to the drawings.

Embodiment 1

FIG. 1 illustrates the basic lens element configuration and positions of the zoom lens of Embodiment 1, at both the wide-angle end W, and the telephoto end T. The movement paths of the lens groups which move when zooming are illustrated.

Figure 2:
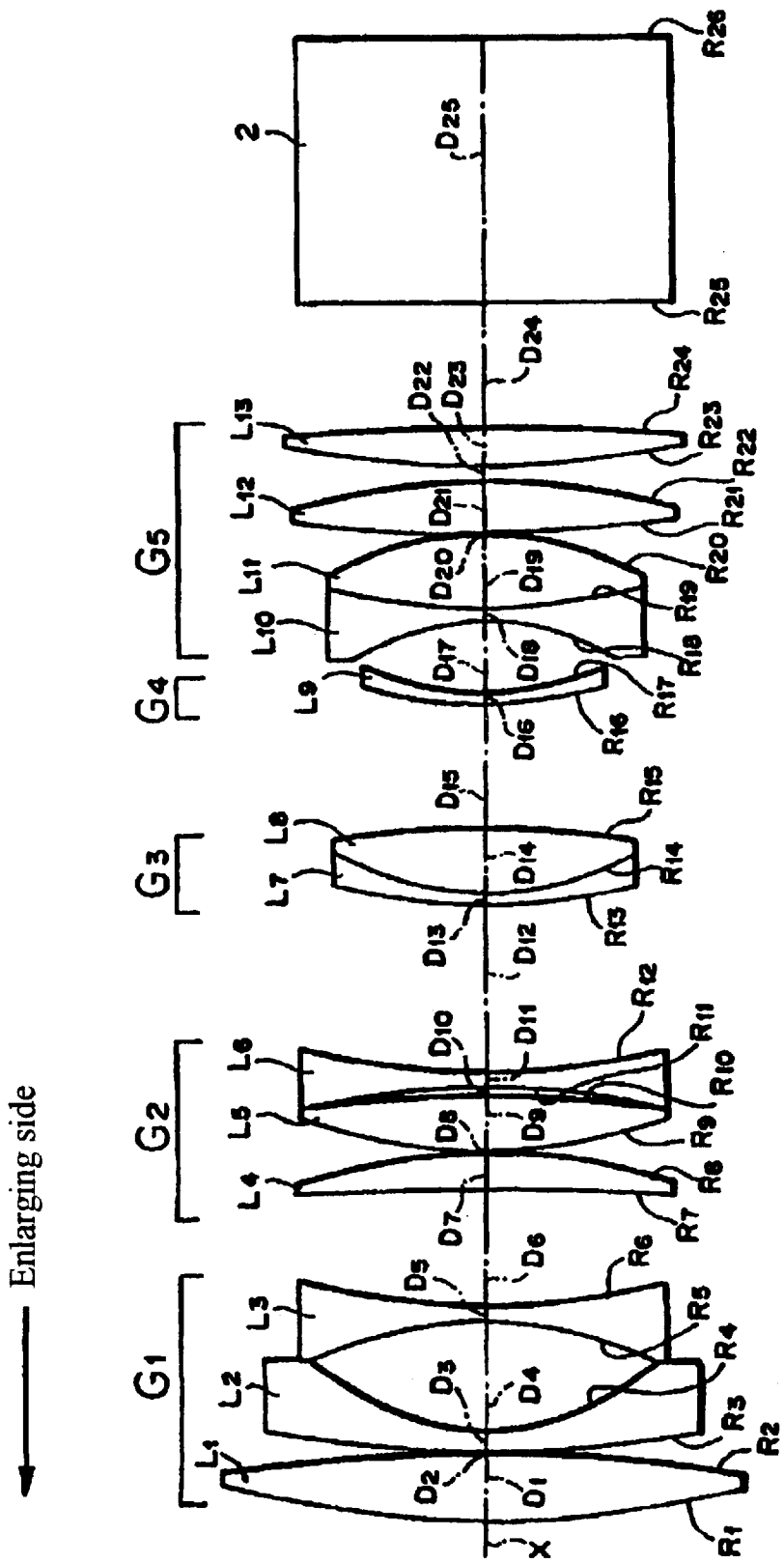
FIG. 2 is a more detailed illustration of the zoom lens configuration of Embodiment 1 at the wide-angle end.

FIG. 2 shows, in somewhat more detail, the basic lens element configuration of the zoom lens of this embodiment at the wide-angle end. As indicated in FIGS. 1 and 2, the zoom lens of Embodiment 1 is constructed of five lens groups. The first lens group $G_1$ has a first lens element $L_1$ of positive refractive power, a second lens element $L_2$ of negative refractive power, and a third lens element $L_3$ of negative refractive power, respectively, in order from the enlarging side. The second lens group $G_2$ has a fourth lens element $L_4$ of positive refractive power, a fifth lens element $L_5$ of positive refractive power, and a sixth lens element $L_6$ of negative refractive power, respectively, in order from the enlarging side. The third lens group $G_3$ has a seventh lens element $L_7$ of negative refractive power and an eighth lens element $L_8$ of positive refractive power, respectively, in order from the enlarging side. The fourth lens group $G_4$ is formed of a ninth lens element $L_9$ of negative refractive power. The fifth lens group $G_5$ is formed of a tenth lens element $L_{10}$ of negative refractive power, an eleventh lens element $L_{11}$ of positive refractive power, a twelfth lens element $L_{12}$ of positive refractive power, and a thirteenth lens element $L_{13}$ of positive refractive power, respectively, in order from the enlarging side.

The spacing between the second lens group $G_2$ and the third lens group $G_3$ decreases when zooming from the wide-angle end to the telephoto end. This feature helps in achieving the goal of creating a very compact zoom lens.

An infrared-blocking filter, a low-pass filter, and/or a color separation optical system 2 may be mounted at the image side of the fifth lens group $G_5$.

The first lens element $L_1$ is bi-convex having surfaces of different curvature, with the surface of smaller radius of curvature on the enlarging side. The second lens element $L_2$ has a negative meniscus shape, with its convex surface on the enlarging side. The third lens element $L_3$ is bi-concave having surfaces of different curvature, with the surface of smaller radius of curvature on the enlarging side. The fourth lens element $L_4$ has a positive meniscus shape, with its convex surface on the image side. The fifth lens element $L_5$ is bi-convex having surfaces of different curvature, with the surface of smaller radius of curvature on the enlarging side. The sixth lens element $L_6$ is bi-concave, with both surfaces having the same refractive power. The seventh lens element $L_7$ is of negative meniscus shape, with its convex surface on the enlarging side. The eighth lens element $L_8$ is bi-convex having surfaces of different curvature, with the surface of smaller radius of curvature on the enlarging side. The ninth lens element $L_9$ is of negative meniscus shape, with its convex surface on the enlarging side. The tenth lens element $L_{10}$ is bi-concave having surfaces of different curvature, with the smaller radius of curvature on the enlarging side. The eleventh lens element $L_{11}$ is bi-convex, having surfaces of different curvature, with the surface of smaller radius of curvature on the image side. The twelfth lens element $L_{12}$ is a bi-convex lens having surfaces of different curvature, with the surface of smaller radius of curvature on the image side. The thirteenth lens element $L_{13}$ is bi-convex, having surfaces of different curvature, with the surface of smaller radius of curvature on the enlarging side. The seventh lens element $L_7$ and the eighth lens element $L_8$ are joined, for example, using index-matching adhesive. Likewise, the tenth lens element $L_{10}$ and the eleventh lens element $L_{11}$ are joined.

Table 1 below lists the surface number # in order from the enlarging side, the radius of curvature R (in mm), the on-axis surface spacing D (in mm), as well as the index of refraction $N_e$ (at the sodium e-line) and the Abbe value $\upsilon$ for this embodiment. Also, at the bottom of the table is listed the $F_{NO}$ and the conjugate distance at the wide-angle end.

TABLE 1

| # | R | D | $N_e$ | $\nu$ |
|---|---|---|---|---|
| 1 | 3,3743 | 0.20826 | 1.51872 | 64.2 |
| 2 | −4.6714 | 0.00592 | | |
| 3 | 4.3199 | 0.06705 | 1.51872 | 64.2 |
| 4 | 0.8048 | 033487 | | |
| 5 | −1.8146 | 0.05325 | 1.64268 | 44.9 |
| 6 | 2.1833 | D6 (variable) | | |
| 7 | −10.3106 | 0.12425 | 1.83945 | 42.7 |
| 8 | −1.6691 | 0.00592 | | |
| 9 | 1.6404 | 0.17355 | 1.83932 | 37.2 |
| 10 | −3.8190 | 0.02679 | | |
| 11 | −2.2769 | 0.04930 | 1.52033 | 58.9 |
| 12 | 2.2769 | D12 (variable) | | |
| 13 | 1.9105 | 0.03944 | 1.85503 | 23.9 |
| 14 | 0.9219 | 0.20215 | 1.71615 | 53.9 |
| 15 | −2.7487 | D15 (variable) | | |

TABLE 1-continued

| # | R | D | $N_e$ | $\nu$ |
|---|---|---|---|---|
| 16 | 1.3328 | 0.03353 | 1.85503 | 23.9 |
| 17 | 0.8882 | D17 (variable) | | |
| 18 | −0.7145 | 0.04142 | 1.85503 | 23.9 |
| 19 | 1.8556 | 0.24139 | 1.62286 | 60.3 |
| 20 | −0.9600 | 0.00592 | | |
| 21 | 4.6980 | 0.16566 | 1.85503 | 23.9 |
| 22 | −2.0063 | 0.05305 | | |
| 23 | 3.1562 | 0.12622 | 1.83932 | 37.2 |
| 24 | −6.2271 | 0.40666 | | |
| 25 | ∞ | 0.40666 | | |
| 26 | ∞ | | | |

$F_{NO}$ = 1.73 (at the wide-angle end)  conjugate distance = 79.73 mm (at the wide-angle end)

Table 2 lists, for Embodiment 1, the spacings between the lens groups at the wide-angle end, at a mid-position and at the telephoto end.

TABLE 2

| | Wide-angle End | Mid-Position | Telephoto End |
|---|---|---|---|
| D6 | 0.38237 | 0.32413 | 0.27477 |
| D12 | 0.52999 | 0.44290 | 0.34283 |
| D15 | 0.42139 | 0.51592 | 0.60916 |
| D17 | 0.23577 | 0.28658 | 0.34276 |

FIGS. 3A–3L show various aberrations of the zoom lens of Embodiment 1. FIGS. 3A–3D show the spherical aberration, astigmatism (in the S and T planes), distortion, and lateral color, respectively, of Embodiment 1 at the wide-angle end, FIGS. 3E–3H show the spherical aberration, astigmatism (in the S and T planes), distortion, and lateral color, respectively, of Embodiment 1 at the mid-position and FIGS. 3I–3L show the spherical aberration, astigmatism (in the S and T planes), distortion, and lateral color, respectively, of Embodiment 1 at the telephoto end.

Embodiment 2

Figure 4:
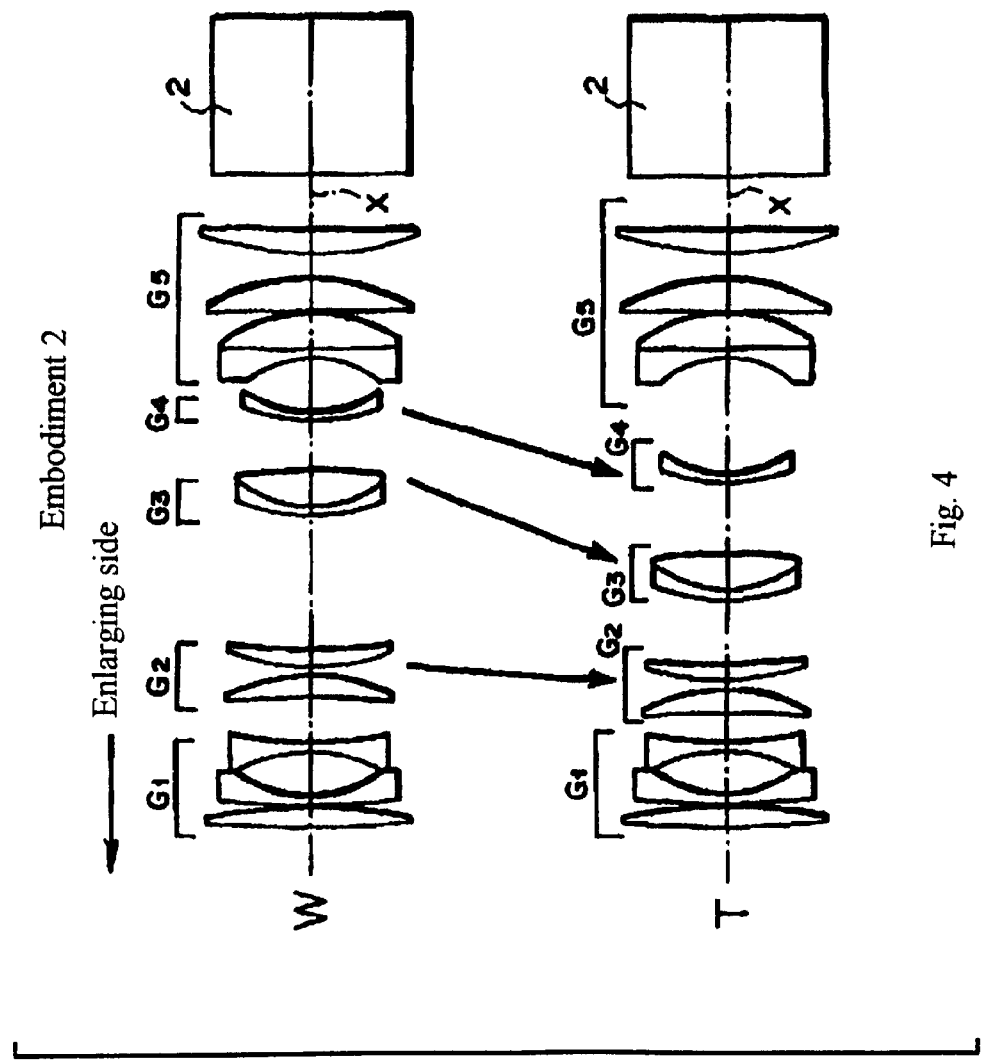
FIG. 4 shows the basic lens element configuration of Embodiment 2 of the invention at the wide-angle end W and the telephoto end T, with the arrows indicating the movement of the lens groups $G_2$–$G_4$ along the optical axis X between these two zoom positions.
Figure 5L:
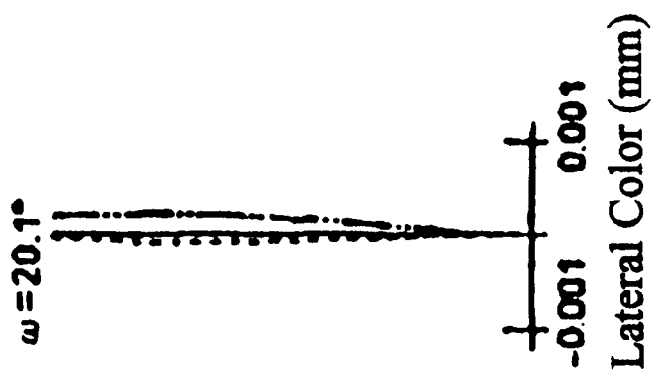
Figure 5K:
Figure 5J:
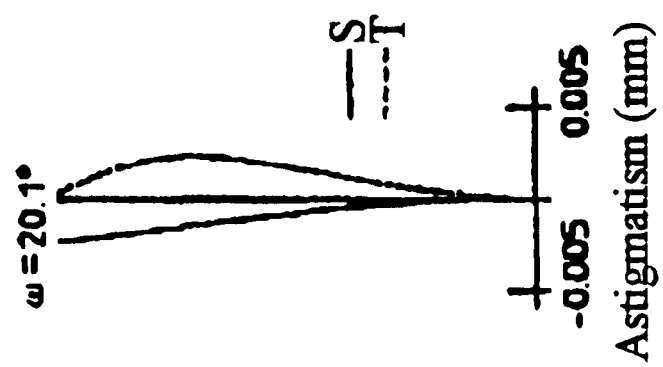
Figure 5I:
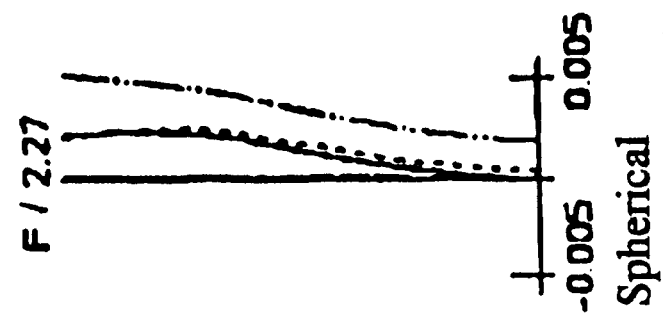

FIG. 4 shows the lens element configuration of the zoom lens of Embodiment 2, wherein 'W' indicates the wide-angle end, and 'T' indicates the telephoto end. The movement paths of the lens groups which move when zooming are illustrated. Embodiment 2 is nearly identical in basic lens element structure to that of Embodiment 1, the primary difference being the second lens group $G_2$ in this embodiment is formed of only two lens elements.

Table 3 below lists the surface number # in order from the enlarging side, the radius of curvature R (in mm), the on-axis surface spacing D (in mm), as well as the index of refraction $N_e$ (at the sodium e-line) and the Abbe value $\upsilon$ for this embodiment. Also, at the bottom of the table is listed the $F_{NO}$ and the conjugate distance at the wide-angle end.

TABLE 3

| # | R | D | $N_e$ | $\nu$ |
|---|---|---|---|---|
| 1 | 9.9962 | 0.11428 | 1.60548 | 60.7 |
| 2 | −2.8392 | 0.00373 | | |
| 3 | 5.5860 | 0.03743 | 1.48915 | 70.4 |
| 4 | 0.7072 | 0.26004 | | |
| 5 | −0.8752 | 0.03170 | 1.673414 | 47.2 |
| 6 | 2.5285 | D6 (variable) | | |
| 7 | −5.7548 | 0.12374 | 1.77621 | 49.6 |
| 8 | −1.1045 | 0.04184 | | |
| 9 | 1.3694 | 0.08509 | 1.81080 | 40.7 |

TABLE 3-continued

| # | R | D | $N_e$ | ν |
|---|---|---|---|---|
| 10 | 3.7703 | D10 (variable) | | |
| 11 | 1.1005 | 0.04106 | 1.83930 | 37.3 |
| 12 | 0.6420 | 0.20580 | 1.62555 | 58.1 |
| 13 | −3.5844 | D13 (variable) | | |
| 14 | 1.2320 | 0.02807 | 1.85507 | 23.8 |
| 15 | 0.7375 | D15 (variable) | | |
| 16 | −0.6187 | 0.04583 | 1.85507 | 23.8 |
| 17 | 15.2791 | 0.20391 | 1.67341 | 47.2 |
| 18 | −0.8782 | 0.00374 | | |
| 19 | ∞ | 0.16189 | 1.77621 | 49.6 |
| 20 | −1.4388 | 0.16906 | | |
| 21 | 1.9085 | 0.14443 | 1.85507 | 23.8 |
| 22 | ∞ | 0.27308 | | |
| 23 | ∞ | 0.86260 | 1.51825 | 64.1 |
| 24 | ∞ | | | |
| $F_{NO}$ = 1.84 (at the wide-angle end) | | conjugate distance = 79.90 mm (at the wide-angle end) | | |

Table 4 lists, for Embodiment 2, the spacings between the lens groups at the wide-angle end; at a mid-position and at the telephoto end.

TABLE 4

| | Wide-angle End | Mid-Position | Telephoto End |
|---|---|---|---|
| D6 | 0.26396 | 0.21488 | 0.17774 |
| D10 | 0.74734 | 0.55672 | 0.36503 |
| D13 | 0.28559 | 0.35291 | 0.40968 |
| D15 | 0.30557 | 0.47795 | 0.65001 |

FIGS. 5A–5L show various aberrations of the zoom lens of Embodiment 2. FIGS. 5A–5D show the spherical aberration, astigmatism (in the S and T planes), distortion, and lateral color, respectively, of Embodiment 2 at the wide-angle end, FIGS. 5E–5H show the spherical aberration, astigmatism (in the S and T planes), distortion, and lateral color, respectively, of Embodiment 2 at the mid-position and FIGS. 5I–5L show the spherical aberration, astigmatism (in the S and T planes), distortion, and lateral color, respectively, of Embodiment 2 at the telephoto end.

Embodiment 3

Figure 6:
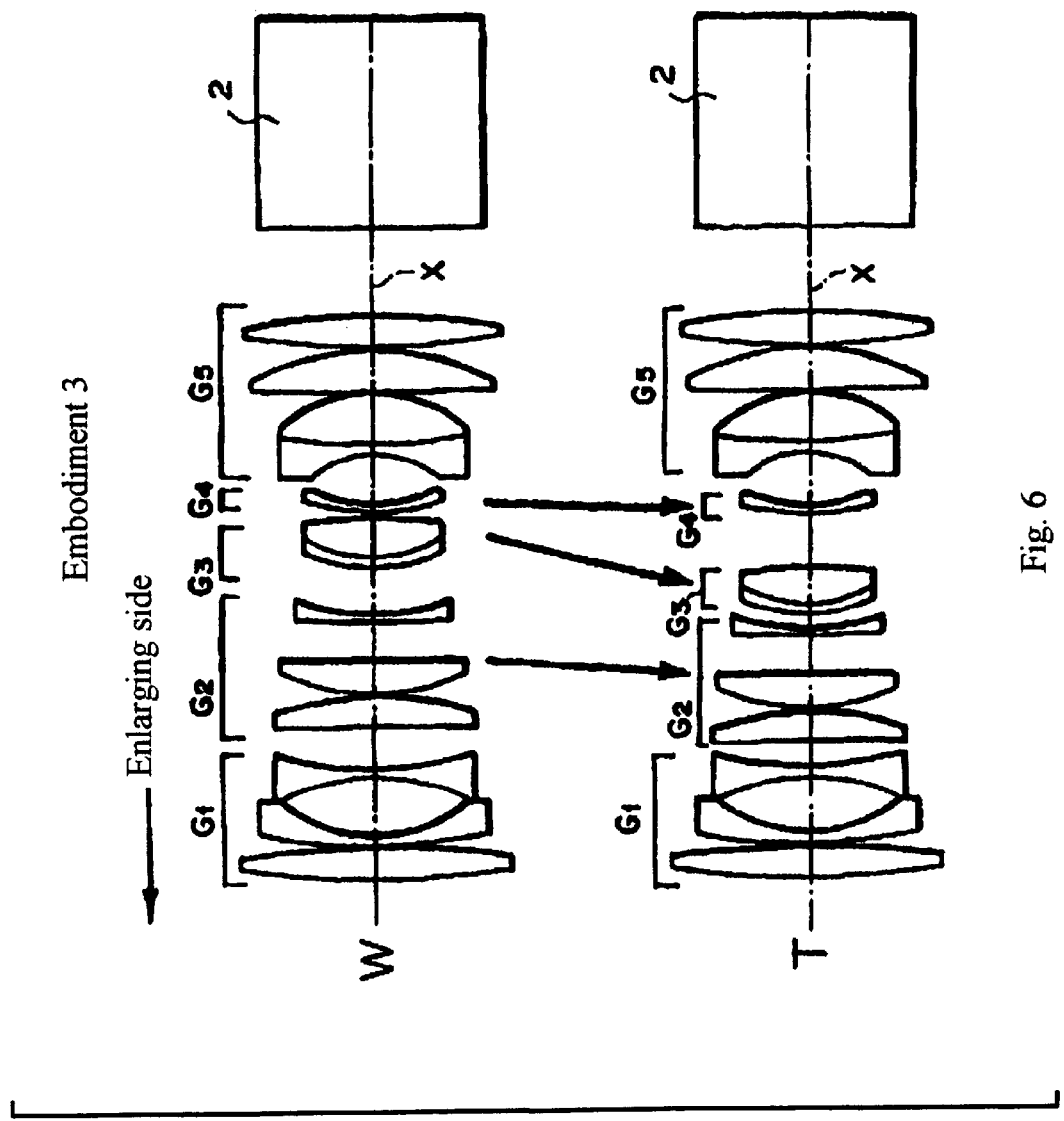
FIG. 6 is an illustration of the zoom lens configuration of Embodiment 3 at the wide-angle end W and the telephoto end T, with the arrows indicating the movement of the lens groups $G_2$–$G_4$ along the optical axis X between these two zoom positions.
Figures 7I, 7J, 7K, 7L:
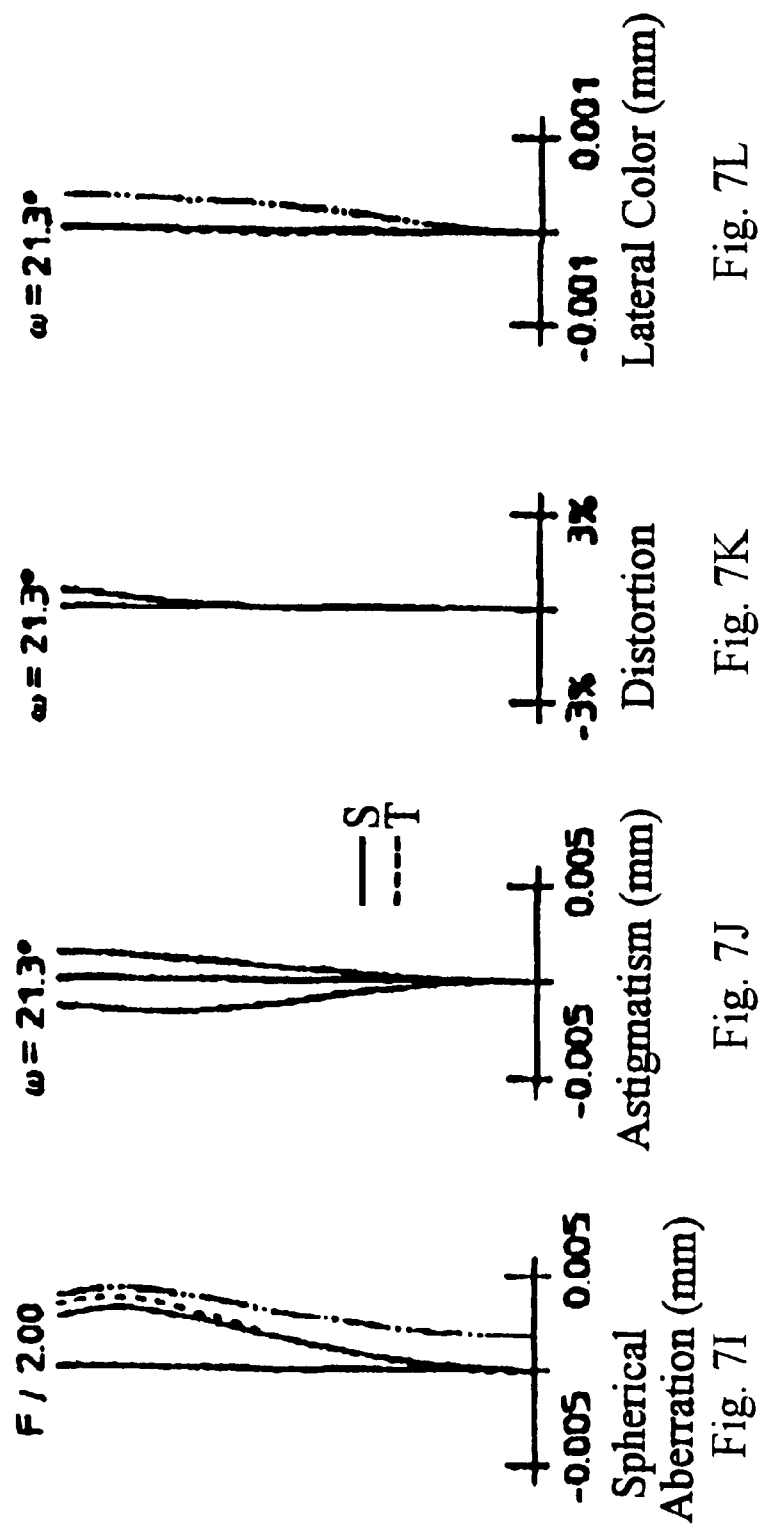

As shown in FIG. 6, the zoom lens of Embodiment 3 is similar to the lens element structure of Embodiment 1 in that the zoom lens of this embodiment also has five lens groups and thirteen lens elements. Embodiment 3 differs in that the sixth lens element $L_6$ in the second lens group $G_2$ (i.e., the lens element of this lens group nearest the image-side) is a negative meniscus lens, with its convex surface on the enlarging side.

Table 5 below lists the surface number # in order from the enlarging side, the radius of curvature R (in mm), the on-axis surface spacing D (in mm), as well as the index of refraction $N_e$ (at the sodium e-line) and the Abbe value υ for this embodiment. Also, at the bottom of the table is listed the $F_{NO}$ and the conjugate distance at the wide-angle end.

TABLE 5

| # | R | D | $N_e$ | ν |
|---|---|---|---|---|
| 1 | 5.6994 | 0.17373 | 1.77621 | 49.6 |
| 2 | −5.6994 | 0.00722 | | |
| 3 | 3.1799 | 0.05051 | 1.48915 | 70.2 |
| 4 | 0.7929 | 0.31225 | | |
| 5 | −1.2444 | 0.04329 | 1.72311 | 29.5 |

TABLE 5-continued

| # | R | D | $N_e$ | ν |
|---|---|---|---|---|
| 6 | 1.7908 | D6 (variable) | | |
| 7 | −102.4658 | 0.16055 | 1.85503 | 23.9 |
| 8 | −1.6254 | 0.00722 | | |
| 9 | 1.2182 | 0.18529 | 1.83932 | 37.2 |
| 10 | −84.8187 | 0.20998 | | |
| 11 | 12.3150 | 0.03969 | 1.48915 | 70.2 |
| 12 | 1.1139 | D12 (variable) | | |
| 13 | 0.9232 | 0.03969 | 1.85503 | 23.9 |
| 14 | 0.6658 | 0.21709 | 1.48915 | 70.2 |
| 15 | −2.1966 | D15 (variable) | | |
| 16 | 1.3148 | 0.03247 | 1.85503 | 23.9 |
| 17 | 0.7928 | D17 (variable) | | |
| 18 | −0.5491 | 0.04690 | 1.85503 | 23.9 |
| 19 | 3.5982 | 0.27640 | 1.59143 | 61.1 |
| 20 | −0.7648 | 0.00722 | | |
| 21 | 19.3357 | 0.24275 | 1.77621 | 49.6 |
| 22 | −1.3536 | 0.00722 | | |
| 23 | 3.9442 | 0.18862 | 1.85503 | 23.9 |
| 24 | −3.9442 | 0.46902 | | |
| 25 | ∞ | 1.11122 | 1.51825 | 64.1 |
| 26 | ∞ | | | |
| $F_{NO}$ = 1.72 (at the wide-angle end) | | conjugate distance = 145.35 mm (at the wide-angle end) | | |

Table 6 lists, for Embodiment 3, the spacings between the lens groups at the wide-angle end, at a mid-position and at the telephoto end.

TABLE 6

| | Wide-angle End | Mid-Position | Telephoto End |
|---|---|---|---|
| D6 | 0.22867 | 0.18198 | 0.14169 |
| D12 | 0.26701 | 0.17661 | 0.08462 |
| D15 | 0.03377 | 0.15214 | 0.27638 |
| D17 | 0.27082 | 0.28954 | 0.29758 |

FIGS. 7A–7L show various aberrations of the zoom lens of Embodiment 3. FIGS. 7A–7D show the spherical aberration, astigmatism (in the S and T planes), distortion, and lateral color, respectively, of Embodiment 3 at the wide-angle end, FIGS. 7E–7H show the spherical aberration, astigmatism (in the S and T planes), distortion, and lateral color, respectively, of Embodiment 3 at the mid-position, and FIGS. 7I–7L show the spherical aberration, astigmatism (in the S and T planes), distortion, and lateral color, respectively, of Embodiment 3 at the telephoto end.

Table 7 below gives the values determined in Conditions (1)–(6) for Embodiments 1, 2 and 3 respectively.

TABLE 7

| | Embodiment 1 | Embodiment 2 | Embodiment 3 |
|---|---|---|---|
| Condition (1) value; | −0.89 | −0.70 | −0.84 |
| Condition (2) value: | 1.35 | 1.04 | 1.02 |
| Condition (3) value: | 1.39 | 1.34 | 1.19 |
| Condition (4) value: | 0.53 | 0.63 | 0.27 |
| Condition (5) value: | 0.17 | 0.34 | 0.16 |
| Condition (6) value: | 23.9 | 37.3 | 23.9 |

As is apparent from Table 7, the zoom lens of the present invention meets all of Conditions 1–6 over the entire range of zoom and, as is apparent from the aberration curves of FIGS. 3A–3L, 5A–L, and 7A–7L, the various aberrations are well-corrected for each embodiment throughout the entire range of zoom. Further, the zoom lens of the present invention is compact for the size of image produced, provides a sufficiently large back focus for the insertion of necessary optical components for use as a projection lens, and provides a bright image.

By designing the spacing between the second lens group and third lens group to decrease when zooming toward the telephoto end, a compact lens design is easier to achieve. In addition, using two or more positive lens elements as components of the second lens group enables the zoom lens to have a low $F_{NO}$ at the wide angle end, thus providing a bright image while enabling the various aberrations to be favorably corrected.

The invention being thus described, it will be obvious that the same may be varied in many ways. For example, the number of lens elements can be modified for a particular lens group, and the radius of curvatures, spacings, and so on may be readily scaled to provide a zoom lens of longer or shorter focal length. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A zoom lens for primary use with a projection screen television system, said zoom lens comprising, in sequential order from the enlarging side:

a first lens group $G_1$ of negative refractive power which is in a fixed position;

a second lens group $G_2$ that has positive refractive power;

a third lens group $G_3$ that has positive refractive power;

a fourth lens group $G_4$ that has negative refractive power; and a fifth lens group $G_5$ that has positive refractive power and is fixed in position wherein the axial positions of the second lens group, the third lens group, and the fourth lens group vary when zooming so as to provide a change in magnification and to correct for shifting of the image surface which otherwise would occur with zooming, and the following conditions are satisfied:

$$-0.9 \leq f_1/F < -0.3$$

$$0.7 < f_2/F < 1.5$$

$$0.8 < f_5/F < 1.5$$

where $f_1$ is the focal length of the first lens group,

F is the focal length of the zoom lens at the wide-angle end, $f_2$ is the focal length of the second lens group, and $f_5$ is the focal length of the fifth lens group.

2. The zoom lens of claim 1, wherein said second lens group $G_2$ includes two or more lens elements, at least two of which have positive refractive power, and the lens group spacing between the second lens group $G_2$ and the third lens group $G_3$ decreases when zooming toward the telephoto end.

3. The zoom lens of claim 1, wherein the following conditions are also satisfied:

$$0.1 < D_2/F < 0.9$$

$$0.05 < |\Delta D_2|/(F \times F_t)^{0.5} < 0.5$$

where $D_2$ is the lens group spacing between the second lens group and the third lens group at the wide-angle end.

$\Delta D_2$ is the change in distance between the second lens group and the third lens group when zooming from the wide-angle end to the telephoto end, and $F_t$ is the focal length of the zoom lens at the telephoto end.

4. The zoom lens of claim 2, wherein the following conditions are satisfied:

$$0.1 < D_2/F < 0.9$$

$$0.05 < |\Delta D_2|/(F \times F_t)^{0.5} < 0.5$$

where $D_2$ is the lens group spacing between the second lens group and the third lens group at the wide-angle end, $\Delta D_2$ is the change in distance between the second lens group and the third lens group when zooming from the wide-angle end to the telephoto end, and $F_t$ is the focal length of the zoom lens at the telephoto end.

5. The zoom lens of claim 1, wherein the third lens group includes two lens elements, one of positive refractive power and the other of negative refractive power, which lens elements may be spaced apart or joined together, and wherein the following condition is satisfied:

$$\upsilon_{(-)} < 40$$

where $\upsilon_{(-)}$ is the Abbe value of said negative refractive power lens element of the third lens group.

6. The zoom lens of claim 2, wherein the third lens group includes two lens elements, one of positive refractive power and the other of negative refractive power, which lens elements may be spaced apart or joined together, and wherein the following condition is satisfied:

$$\upsilon_{(-)} < 40$$

where $\upsilon_{(-)}$ is the Abbe value of said negative refractive power lens element of the third lens group.

7. The zoom lens of claim 3, wherein the third lens group includes two lens elements, one of positive refractive power and the other of negative refractive power, which lens elements may be spaced apart or joined together, and wherein the following condition is satisfied:

$$\upsilon_{(-)} < 40$$

where $\upsilon_{(-)}$ is the Abbe value of said negative refractive power lens element of the third lens group.

8. The zoom lens of claim 4, wherein the third lens group includes two lens elements, one of positive refractive power and the other of negative refractive power, which lens elements may be spaced apart or joined together, and wherein the following condition is satisfied:

$$\upsilon_{(-)} < 40$$

where $\upsilon_{(-)}$ is the Abbe value of said negative refractive power lens element of the third lens group.

* * * * *

UNITED STATES PATENT AND TRADEMARK OFFICE
CERTIFICATE OF CORRECTION

PATENT NO. : 6,222,680 B1
DATED : April 24, 2001
INVENTOR(S) : Yamamoto et al.

It is certified that error appears in the above-identified patent and that said Letters Patent is hereby corrected as shown below:

Column 5,
Table 1, second column, for surface #1, change the value of R from "3,3743" to -- 3.3743 --;

Column 6,
Table 1, third column, for surface #25, change the value of D from "0.40666" to -- 0.84408 --;
Table 1, fourth column, for surface #25, insert the following value for $N_e$: -- 1.51825 --; and
Table 1, fifth column, for surface #25, insert the following value for $\upsilon$: -- 64.1 --.

Signed and Sealed this

Twenty-seventh Day of November, 2001

Attest:

NICHOLAS P. GODICI
Attesting Officer
Acting Director of the United States Patent and Trademark Office